Patented Oct. 28, 1941

2,260,295

UNITED STATES PATENT OFFICE 2,260,295

PLASTICIZER AND PLASTIC COMPOSITION

Thomas F. Carruthers, South Charleston, and Charles M. Blair, Charleston, W. Va., assignors to Carbide and Carbon Chemicals Corporation, a corporation of New York No Drawing. Application August 24, 1938,
Serial No. 226,482

5 Claims. (Cl. 260—36)

This invention relates to esters of lower aliphatic hydroxy acids esterified with dibasic acids, and it has for its principal object the production of a new class of compounds which are excellent plasticizers for many plastic materials. These compounds are especially suitable as plasticizers for such materials as cellulose derivatives, particularly the nitrate and acetate esters, and the alkyd and vinyl resins. Of the latter the new compounds form especially desirable compositions with vinyl ester resins, such as polyvinyl chloride and the products which may result from the conjoint polymerization of a vinyl halide with a vinyl ester of a lower aliphatic acid (particularly vinyl chloride with vinyl acetate).

The products of this invention are made by reacting the ester of the hydroxy acid with a dibasic acid in the presence of a dehydrating agent, or with the anhydride of the dibasic acid. In particular, the alkyl and alkoxy alkyl esters of monohydroxy aliphatic acids are preferred, and the dicarboxylic acids reacted therewith may be either aromatic or aliphatic.

The following examples will serve to illustrate the invention:

EXAMPLE I.—*Succinyl di(butoxy ethyl lactate)*

| | Parts by weight |
|---|---|
| Monobutyl ether of ethylene glycol | 1652 |
| 85% lactic acid | 1272 |
| Anhydrous aluminum sulfate | 31 |
| Benzene | 264 |

The above materials were refluxed together and the water formed was removed from the system as an azeotropic mixture with the benzene. The maximum reaction temperature was 147° C. When the reaction was complete the mixture was distilled under reduced pressure. The butoxy ethyl lactate was recovered from this reaction and acylated as follows:

| | Parts by weight |
|---|---|
| Butoxy ethyl lactate | 1244 |
| Succinic acid | 354 |
| Anhydrous aluminum sulfate | 16 |
| Benzene | 440 |

After refluxing the above materials for four or five hours with consequent removal of the water as an azeotropic mixture with the benzene, the mixture was neutralized by stirring with a solution of sodium carbonate, washed with water and distilled free of low-boiling materials under reduced pressure.

The product is a pale yellow viscous liquid having a slight odor. It is immiscible with water and has a specific gravity of 1.072 at 20°/20° C. The saponification equivalent was found to be 121.8 as compared with the theoretical value of 115.1, and it probably has the following structure:

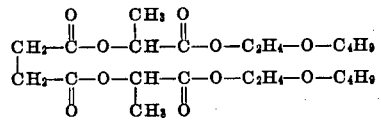

EXAMPLE II.—*Succinyl di(butyl lactate)*

| | Parts by weight |
|---|---|
| Butyl lactate | 1606 |
| Succinic acid | 590 |
| Sulfuric acid | 5.5 |
| Benzene | 264 |

The procedure in this example was the same as in the acylation step of Example I. The product is a light yellow odorless liquid which is immiscible with water. It has a specific gravity of 1.057 at 20°/20° C. and has a saponification equivalent of 97.2 as compared to the theoretical value of 93.5. The probable structure of the compound is:

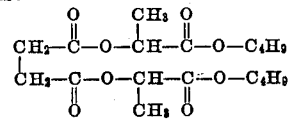

EXAMPLE III.—*Succinyl di(methoxy ethyl lactate)*

| | Parts by weight |
|---|---|
| Monomethyl ether of ethylene glycol | 547 |
| 85% lactic acid | 635 |
| Anhydrous aluminum sulfate | 12 |
| Benzene | 440 |

The above materials were refluxed together and the water formed was removed from the system with the benzene. The maximum reaction temperature was 101° C. The methoxy ethyl lactate, which was recovered from the reaction mixture in the same manner as the butoxy ethyl lactate was recovered in Example I, was acylated with succinic acid as follows:

| | Parts by weight |
|---|---|
| Methoxy ethyl lactate | 794 |
| Succinic acid | 472 |
| Sulfuric acid | 3.7 |
| Benzene | 264 |

The procedure was the same as in Example I, with the exception that the final product was recovered by distillation under reduced pressure. The product is a pale yellow viscous liquid slightly soluble in water. It has a specific gravity of 1.168 at 20°/20° C. and a saponification equivalent of 93.7 as compared with the theoretical value of 94.5. The probable structure of the compound is:

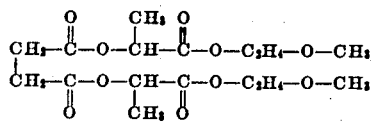

EXAMPLE IV.—*Maleyl di(butyl lactate)*

| | Parts by weight |
|---|---|
| Butyl lactate | 1606 |
| Maleic acid | 580 |
| Sulfuric acid | 5.5 |
| Benzene | 264 |

The procedure was the same as in Example II. The product is a light yellow liquid with faint odor and it is insoluble in water. It has a specific gravity of 1.058 at 20°/20° C. and has a saponification equivalent of 100.5 as compared with the theoretical value of 93. The probable structure of the compound is:

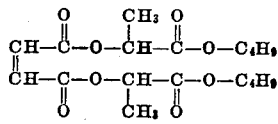

EXAMPLE V.—*Phthalyl di(acetyloxy ethoxy ethyl glycollate)*

| | Parts by weight |
|---|---|
| Diethylene glycol monoacetate | 592 |
| Glycollic acid | 304 |
| Aluminum chloride | 9 |
| Benzene | 264 |

The above materials were heated and the water formed was removed by distillation with the benzene. The diethylene glycol monoacetate glycollate thus formed was treated with phthalic anhydride as follows:

| | Parts by weight |
|---|---|
| Diethylene glycol monoacetate glycollate | 525 |
| Phthalic anhydride | 130 |
| Benzene | 88 |

The procedure was the same as in Example II. The product is a very viscous amber-colored liquid with slight odor. It is insoluble in water and has a specific gravity of 1.239 at 20°/20° C. Its saponification equivalent was 93.8 as compared with the theoretical value of 90.3, and the probable structure of the compound is:

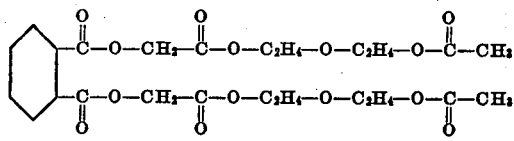

All of the products described in the above examples are compatible in large amounts with a variety of cellulose derivatives including the nitrate and acetate esters, certain of the cellulose ethers, with alkyd resins, and with polymeric vinyl chloride and the conjoint polymerization products of a vinyl halide with a vinyl ester of a lower aliphatic acid. They are particularly compatible with conjoint polymers of vinyl chloride and vinyl acetate containing between 70% and 95% vinyl chloride in the polymer. The latter resins when plasticized with the above compounds yield compositions which are useful for a number of applications. When highly plasticized these compositions have good flexibility and may be used in the preparation of coating compositions, such as lacquers. With less plasticizer the compositions are useful in making molded articles, flexible sheets, and the like. All of these compounds are extremely high boiling liquids, and hence they are retained almost indefinitely by compositions containing them.

Other modifications will be apparent and the invention should not be limited other than as defined in the appended claims.

We claim:

1. A plastic composition comprising an ester of a lower aliphatic monohydroxy acid esterified with an unsubstituted dicarboxylic acid intimately associated with a vinyl resin.

2. A plastic composition comprising a vinyl resin intimately associated with an ester of a lower aliphatic monohydroxy acid esterified with an unsubstituted dicarboxylic acid having the carboxyl groups attached to adjacent carbon atoms.

3. A plastic composition comprising a vinyl resin substantially identical with a resin resulting from the conjoint polymerization of vinyl chloride with vinyl acetate, intimately associated with succinyl di(methoxy ethyl lactate).

4. A plastic composition comprising a vinyl resin substantially identical with a resin resulting from the conjoint polymerization of vinyl chloride with vinyl acetate, intimately associated with maleyl di(butyl lactate).

5. A plastic composition comprising a vinyl resin substantially identical with a resin resulting from the conjoint polymerization of vinyl chloride with vinyl acetate, intimately associated with phthalyl di(acetyloxy ethoxy ethyl glycollate).

THOMAS F. CARRUTHERS.
CHARLES M. BLAIR.